(12) United States Patent
Pan (10) Patent No.: US 11,781,918 B2
(45) Date of Patent: Oct. 10, 2023

(54) SYSTEMS AND METHODS FOR REDUCING TEMPERATURE SENSOR READING VARIATION DUE TO DEVICE MISMATCH

(71) Applicant: MICRON TECHNOLOGY, INC., Boise, ID (US)

(72) Inventor: Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1125 days.

(21) Appl. No.: 16/509,262

(22) Filed: Jul. 11, 2019

(65) Prior Publication Data
US 2019/0339134 A1  Nov. 7, 2019

Related U.S. Application Data

(62) Division of application No. 14/866,371, filed on Sep. 25, 2015, now Pat. No. 10,352,775.

(51) Int. Cl.
*G01K 7/01* (2006.01)
*G01K 3/06* (2006.01)

(52) U.S. Cl.
CPC .................. *G01K 7/01* (2013.01); *G01K 3/06* (2013.01)

(58) Field of Classification Search
CPC .................................. G01K 7/01; G01K 3/06
See application file for complete search history.

(56) References Cited

U.S. PATENT DOCUMENTS

| | | |
|---|---|---|
| 5,440,305 A | 8/1995 | Signore et al. |
| 2006/0190210 A1 | 8/2006 | Mukherjee |
| 2006/0221741 A1* | 10/2006 | Jain .................... G11C 11/40626 374/E7.043 |
| 2008/0091378 A1 | 4/2008 | Jeong et al. |
| 2009/0129438 A1 | 5/2009 | Pan |
| 2011/0234300 A1 | 9/2011 | Zhang et al. |
| 2016/0047696 A1* | 2/2016 | Ramaraju ................ G01K 7/01 374/170 |

* cited by examiner

*Primary Examiner* — Lisa M Caputo
*Assistant Examiner* — Janice M Soto
(74) *Attorney, Agent, or Firm* — Dorsey & Whitney LLP (57) ABSTRACT

A temperature sensor is disclosed. The temperature sensor includes an analog core having at least first and second circuit nodes and configured to provide a temperature dependent output, a multiplexer coupled to the first and second circuit nodes and configured for at least first and second states in each of which the first circuit node couples to a different circuit element and in each of which the second circuit node couples to a different circuit element, and a controller coupled to the analog core and configured to provide a temperature measurement that is an average of at least first and second readings of the temperature dependent output of the analog core, the first reading taken while the multiplexer is in the first state, and the second reading taken while the multiplexer is in the second state.

18 Claims, 8 Drawing Sheets

SYSTEMS AND METHODS FOR REDUCING TEMPERATURE SENSOR READING VARIATION DUE TO DEVICE MISMATCH

CROSS-REFERENCE TO RELATED APPLICATION(S)

This application is a divisional of U.S. patent application Ser. No. 14/866,371, filed Sep. 25, 2015 and issued as U.S. Pat. No. 10,352,775 on Jul. 16, 2019. This application, and issued patent, is incorporated by reference herein in its entirety and for any purposes.

BACKGROUND

Semiconductor devices, such as memory devices and processors, can often operate at different temperatures. These devices may have a temperature sensor within the device to allow them to adjust some of their operations based on temperature readings provided by the temperature sensor. Conventional temperature sensors may provide relatively accurate temperature readings when components within the sensor are matched. However, when components within the sensor become mismatched, some conventional temperature sensors may provide temperature readings with reduced accuracy.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

The present disclosure is directed to systems and methods for mitigating certain errors that occur in temperature sensors used in integrated circuits, memory devices, or other electronic devices. Disclosed systems and methods mitigate errors that may be present in temperature readings provided by an analog core of a temperature sensor. The errors may be present in the temperature readings due to mismatches between certain circuit elements within the analog core. Potentially mismatched circuit elements in the analog core include certain pairs or groups of circuit elements that are adapted to be matched as part of the design of the analog core. When such a pair or group of circuit elements remains matched, the contribution of that pair or group of circuit elements to the function of the analog core remains optimal. When such a pair or group of circuit elements becomes mismatched, the contribution of that pair or group of circuit elements to the function of the analog core degrades and errors occur in the temperature readings. As used herein, a pair or group of circuit elements is "matched" when corresponding parameters such as size, alignment, DC offset, operating point, and so on are substantially equal in each circuit element of the pair or group of circuit elements. Pairs or groups of circuit elements may become mismatched due to various causes such as process variation during fabrication of the circuit elements, or the like.

Figure 1:
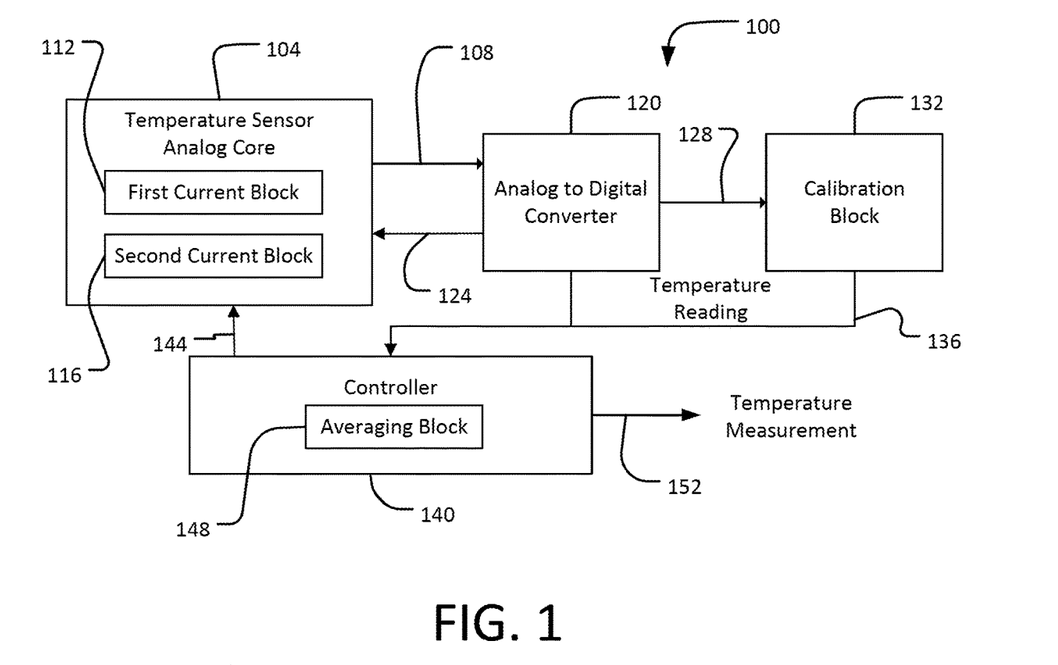
FIG. 1 is a schematic illustration of a temperature sensor in accordance with the present disclosure.

FIG. 1 is a schematic illustration of an apparatus (e.g., an integrated circuit, a memory device, a memory system, an electronic device or system, a smart phone, a tablet, a computer, a server, etc.) that includes a temperature sensor 100 in accordance with the present disclosure. The temperature sensor 100 may be a component of an integrated circuit, memory device, or other electronic device. The temperature sensor 100 includes an analog core 104 that is generally configured to generate a temperature dependent output signal 108 that may be sampled to acquire a temperature reading from the analog core 104. The analog core 104 may be configurable into a plurality of different states that provide alternative couplings between certain pairs or groups of circuit elements. The temperature sensor 100 may sample the temperature dependent output 108 in each of the plurality of analog core 104 states to acquire a group of temperature readings. The temperature sensor 100 may then generate a temperature measurement by averaging the group of temperature readings so as to cancel out errors that may be present in individual temperature readings due to device mismatches. The temperature sensor 100 may then provide the resulting temperature measurement as output to be used by the integrated circuit, memory device, or electronic device with which the temperature sensor 100 is associated. By way of example, if the temperature sensor 100 is associated with a memory device, the memory device may use the temperature measurement provided by the temperature sensor 100 to determine a refresh rate.

The analog core 104 may provide a temperature dependent output 108 that takes the form of one or more temperature dependent currents. The analog core 104 may generate a temperature dependent current through the operation of one or more devices whose operating characteristics change with changes in temperature. In one example, the analog core 104 may include a diode, a bipolar junction transistor (BJT) or a BJT coupled diode that generates a temperature dependent current. In other examples, the analog core 104 may generate a temperature dependent current through the operation of a field effect transistor or similar device. Generally, the analog core 104 may generate a temperature dependent current via any diode, transistor, semiconductor or other electronic device that exhibits a temperature dependent behavior.

The analog core 104 may include a first current block 112 that provides a first temperature dependent current that is directly proportional to temperature. The temperature sensor 100 may be configured to sample the first current or to otherwise use the first current in an output 108 sampling process that acquires a temperature reading from the analog core 104. Because the first current is directly proportional to temperature, the temperature sensor 100 registers an increase in the magnitude of the first current as an increase in temperature. Conversely, the temperature sensor 100 registers a decrease in the magnitude of the first current as a decrease in temperature. In some embodiments, the analog core 104 additionally includes a second current block 116 that provides a second temperature dependent current that is inversely proportional to temperature. The temperature sensor 100 may be configured to sample the second current or to otherwise use the second current to support temperature sensing.

Figure 2:
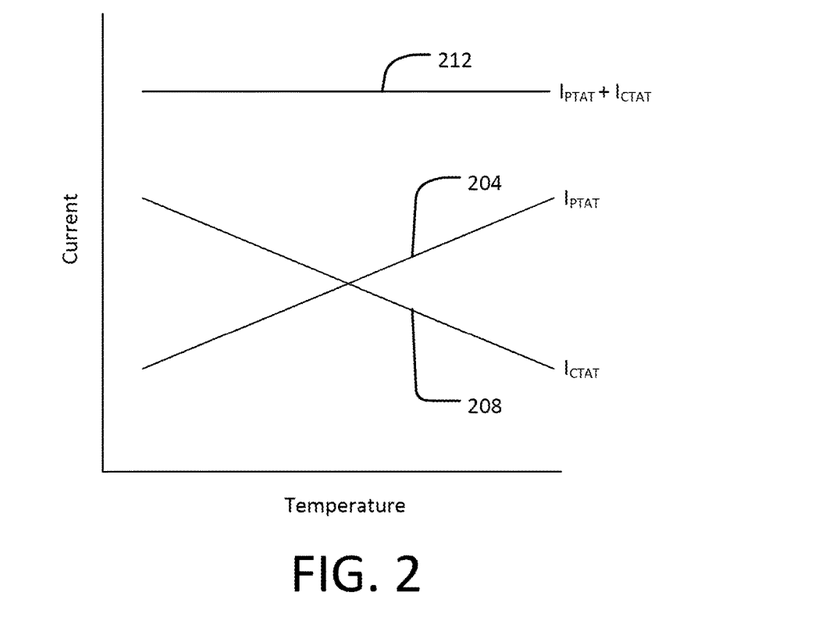
FIG. 2 is a graph showing a temperature dependent output provided by the analog core shown in FIG. 1.

FIG. 2 is a graph 200 showing a temperature dependent output provided by the analog core 104, including example signal traces for the first current 204 and second current 208. A first temperature dependent current 204 that is directly proportional to temperature is generally referred to herein as $I_{PTAT}$. A second temperature dependent 208 current that is inversely proportional to temperature is generally referred to herein as $I_{CTAT}$. FIG. 2 additionally includes a third signal trace 212 that represents the sum of $I_{PTAT}$ and $I_{CTAT}$. As can be seen in FIG. 2, the sum of $I_{PTAT}$ and $I_{CTAT}$ is generally independent of temperature. Thus, the temperature sensor 100 may use the sum of $I_{PTAT}$ and $I_{CTAT}$ as a reference or baseline when sensing temperature. More specifically, the temperature sensor 100 may measure $I_{PTAT}$ and $I_{CTAT}$ and then calculate or otherwise generate the ratio of $I_{PTAT}$ to the sum of $I_{PTAT}$ and $I_{CTAT}$. This ratio may generally indicate a present temperature, as sensed by the analog core 104. The closer this ratio is to one, the more the $I_{PTAT}$ contribution dominates. Here, the ratio indicates higher temperatures. The closer the ratio is to zero, the more the $I_{CTAT}$ contribution dominates. Here, the ratio indicates lower temperatures.

Figure 3:
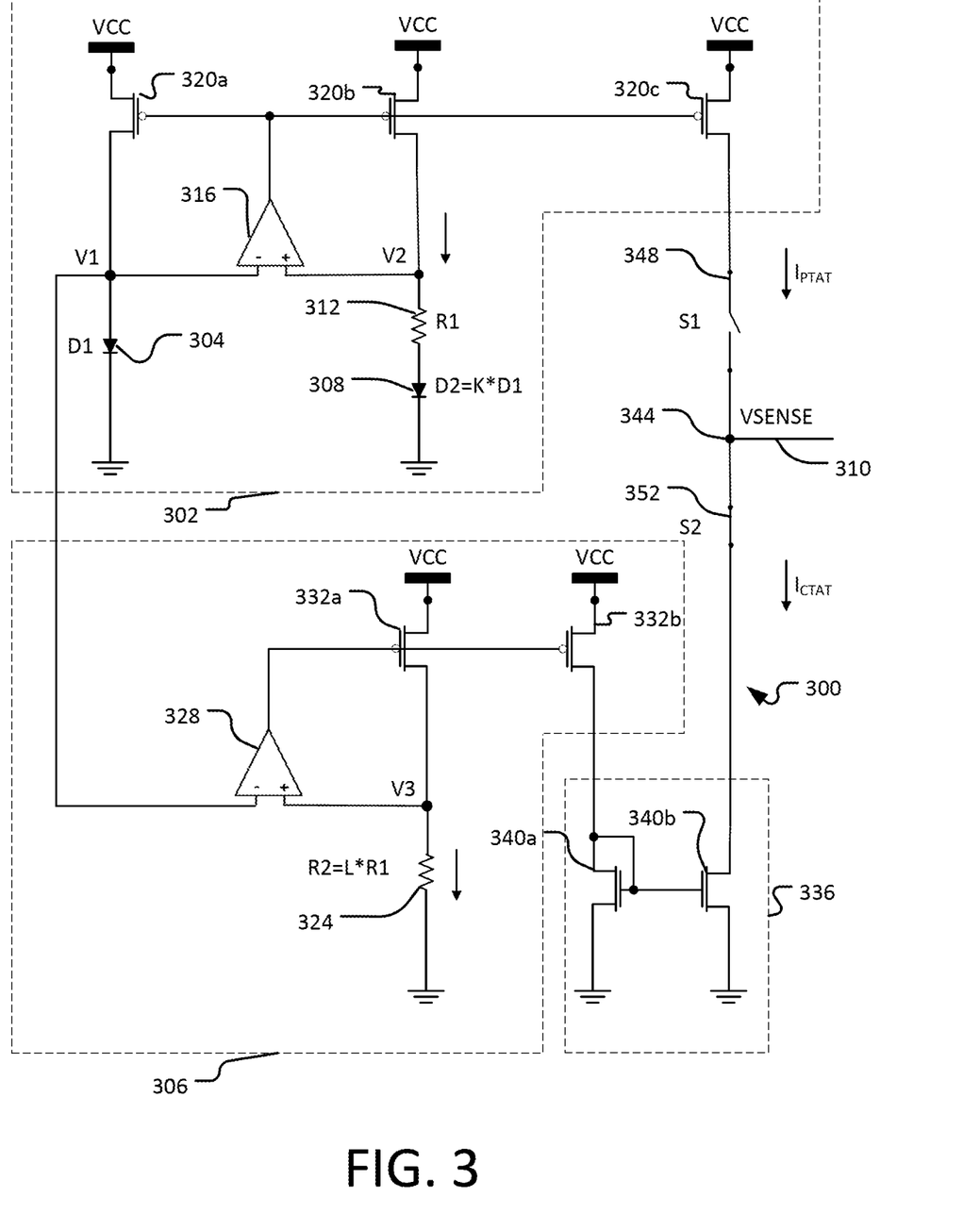
FIG. 3 is a schematic illustration of an example analog core in accordance with the present disclosure.

FIG. 3 is a circuit diagram of an example analog core 300. In some embodiments, the analog core 300 may be used in connection with the temperature sensor 100 shown in FIG. 1. The analog core 300 includes a first current block 302 that generates a first temperature dependent current ($I_{PTAT}$), which is directly proportional to temperature. The first current block 302 generates the first temperature dependent current through the operation of diodes, by way of example and not limitation. Here, the first current block 302 includes a diode $D_1$, which is generally indicated with reference numeral 304. The diode $D_1$ is coupled between ground and a $V_1$ node. The first current block 302 additionally includes a diode $D_2$, indicated with reference numeral 308. The diode $D_2$ is coupled between ground and a $V_2$ node through a resistor $R_1$, indicated with reference numeral 312. The $D_2$ diode is configured to be larger in size than the $D_1$ diode. The $D_2$ diode may larger than the $D_1$ diode by an arbitrary multiple, which in FIG. 3 is generally indicated with the letter "K". In accordance with various embodiments, K may be equal to 2, 3, 4, 5, 6, 7, and so on. The $D_2$ diode may be configured as a group of K smaller diodes. For example, if the $D_2$ diode is configured to be five times larger than the $D_1$ diode, then the $D_2$ diode may be configured as a group of five diodes.

The first current block 302 is configured to keep the $V_1$ and $V_2$ nodes at substantially the same voltage, which produces a temperature dependent current through the $R_1$ resistor. Specifically, with the $V_1$ and $V_2$ nodes having equal voltages, the differently sized diodes $D_1$ and $D_2$ diode generate the first temperature dependent current ($I_{PTAT}$) through the $R_1$ resistor. The $V_1$ and $V_2$ nodes are generally kept at the same voltage through the operation of an amplifier 316 that is configured as a feedback element within the first current block 302. The inverting input of the amplifier 316 is coupled to the $V_1$ node. The non-inverting input of the amplifier 316 is coupled to the $V_2$ node. The amplifier 316 drives current sourcing transistors 320a-b, which provide current to the $V_1$ and $V_2$ nodes. A first current sourcing transistor 320a provides current to the $V_1$ node and thus to the $D_1$ diode. A second current sourcing transistor 320b provides current to the $V_2$ node and thus to the $D_2$ diode. The first current block 302 additionally includes a third current sourcing transistor 320c, which is configured as a current mirror. Here, the third current sourcing transistor 320c mirrors the temperature dependent current ($I_{PTAT}$) generated in the $R_1$ resistor from the first current block 302 to the analog core output 310.

The example analog core 300 shown in FIG. 3 additionally includes a second current block 306 that generates a second temperature dependent current ($I_{CTAT}$), which is inversely proportional to temperature. The second current block 306 generates the second temperature dependent current, in part, through the operation of the diodes $D_1$ and $D_2$ associated with the first current block 302. Here, the second current block 306 includes a resistor $R_2$, indicated with reference numeral 324. The $R_2$ resistor is coupled between ground and a $V_3$ node. The $R_2$ resistor is configured to be larger in size than the $R_1$ resistor. The $R_2$ resistor may be larger than the $R_1$ resistor by an arbitrary multiple, which in FIG. 3 is generally indicated with the letter "L". In accordance with various embodiments, L may be equal to 2, 3, 4, 5, 6, 7, and so on.

The second current block 306 is configured to keep the $V_3$ and $V_1$ nodes at related voltages, which produces a temperature dependent current through the $R_3$ resistor. Specifically, with the $V_3$ and $V_1$ nodes having related voltages, the differently sized resistors $R_1$ and $R_2$ generate the second temperature dependent current ($I_{CTAT}$) through the $R_2$ resistor. The voltages of the $V_3$ and $V_1$ nodes are related through the operation of an amplifier 328 that is configured as a feedback element within the second current block 306. The inverting input of the amplifier 328 is coupled to the $V_1$ node. The non-inverting input of the amplifier 328 is coupled to the $V_3$ node. The amplifier 328 drives a current sourcing transistor 332a, which provides current back to the $V_3$ node and thus to the $R_2$ resistor. The second current block 306 additionally includes a second current sourcing transistor 332b, which is configured as a current mirror. Here, the second current sourcing transistor 332b functions to mirror the temperature dependent current ($I_{CTAT}$) generated in the $R_2$ resistor from the second current block 306 to a current mirror 336, which in turn mirrors the current to the analog core output 310. The current mirror 336 includes a first current sinking transistor 340a coupled to the first current block 306 and a second current sinking transistor 340b configured as a current mirror and coupled to the analog core output 310.

In the analog core 300 shown in FIG. 3, the first current block 302 and the second current block 306 are provided in association with a $V_{SENSE}$ node, indicated by reference numeral 344. The $V_{SENSE}$ node may be coupled to the output 310 of the analog core 300. The first current block 302 provides $I_{PTAT}$ to the $V_{SENSE}$ node through a first switch 348. Similarly, the second current block 306 provides $I_{CTAT}$ to the $V_{SENSE}$ node through a second switch 352. In connection with taking temperature measurements from the analog core 300, the first switch 348 and second switch 352 may be used to control the paths of $I_{PTAT}$ and $I_{CTAT}$ so as to control the voltage present at the $V_{SENSE}$ node. For example, the first switch 348 may be closed and the second switch 352 opened such that the $V_{SENSE}$ node is pulled-up by the $I_{PTAT}$ current. Alternatively, the first switch 348 may opened and the second switch 352 closed such that the $V_{SENSE}$ node is pulled-down by the $I_{CTAT}$ current.

Referring to FIGS. 1 and 3, the analog core 300 may provide a temperature dependent output 310 to an analog-to-digital converter 120. The analog-to-digital converter 120 is generally configured to convert the temperature dependent output 310 from the analog core 300 to a digital code representing a temperature reading. In acquiring the temperature reading, the analog-to-digital converter 120 may provide various control inputs 124 that operate to control various components of the analog core 300. In one respect, the analog-to-digital converter 120 may provide control inputs 124 to the first switch 348 and second switch 358 so as to use $I_{PTAT}$ and $I_{CTAT}$ to drive the $V_{SENSE}$ node to a reference voltage. When the $V_{SENSE}$ node is below the reference voltage, the analog-to-digital converter 120 may close the first switch 348 and open the second switch 352 such that the $V_{SENSE}$ node is pulled-up by the $I_{PTAT}$ current. When the $V_{SENSE}$ node is above the reference voltage, the analog-to-digital converter 120 may open the first switch 348 and close the second switch 352 such that the $V_{SENSE}$ node is pulled-down by the $I_{CTAT}$ current. When the analog-to-digital converter 120 operates in this manner, the analog-to-digital converter 120 may take a temperature reading of the analog core 300 by reading a digital code that corresponds to the number of times during a predetermined interval that the first switch 348 is opened.

Referring to FIG. 1, the analog-to-digital converter 120 may provide the digital code read from the analog core 300 as output 128 to a calibration block 132 in some embodiments. The calibration block 132 may be configured to re-center the digital code at a zero point based on a baseline temperature around which the analog core 300 is known to operate. The calibration block 132 may re-center the digital code provided by the analog-to-digital converter 120 by subtracting out an offset that is determined by analog core 300 output measured at the baseline temperature. For example, if the baseline temperature is 90° C., the analog-to-digital converter 120 may read the analog core 300 at this temperature and the calibration block 132 may store the resulting digital code as a predetermined offset. When the calibration block 132 subtracts this offset from subsequent temperature measurement, the resulting digital code is re-centered at 90° C. such that a digital code of 0x00 corresponds to a temperature of 90° C. This re-centered digital code may be provided as the final temperature sensor 100 output. The analog-to-digital converter 120 may be configured to increment or decrement the digital code by 1 for every 1° C. change in temperature. Thus, continuing with the above example, the final temperature sensor output may be 0x01 at 91° C., 0x0A at 100° C., 0xFF at 89° C., and so on. In some embodiments, the calibration block 132 determines an offset during an initial setup when the temperature sensor 100 is first enabled. In other embodiments, the calibration block 132 determines an offset each time a temperature reading or group of temperature readings are taken from the analog core 300. Once the temperature reading is acquired and fully processed, the analog-to-digital converter 120 or the calibration block 132 may provide the temperature reading as output 136 to a controller 140.

An analog core 300 in accordance with the present disclosure may be configured into a plurality of different states that include alternative couplings between certain pairs or groups of circuit elements, as will be described in more detail below. The different states may provide different temperature readings that are averaged to produce a temperature measurement that mitigates errors occurring due to mismatched circuit elements. In this regard, the controller 140 may be configured to provide control inputs 144 that cycle the analog core 300 through the states in which it may be configured. Temperature readings acquired during each cycle are received as input 136 at the controller 140 and averaged through the operation of an averaging block 148. The average of the various temperature readings is provided as output 152 from the controller 128 as a temperature measurement. Here, errors that may be present in individual temperature readings may cancel each other out from the averaged value that the controller 128 provides as the temperature measurement.

Figure 4A:
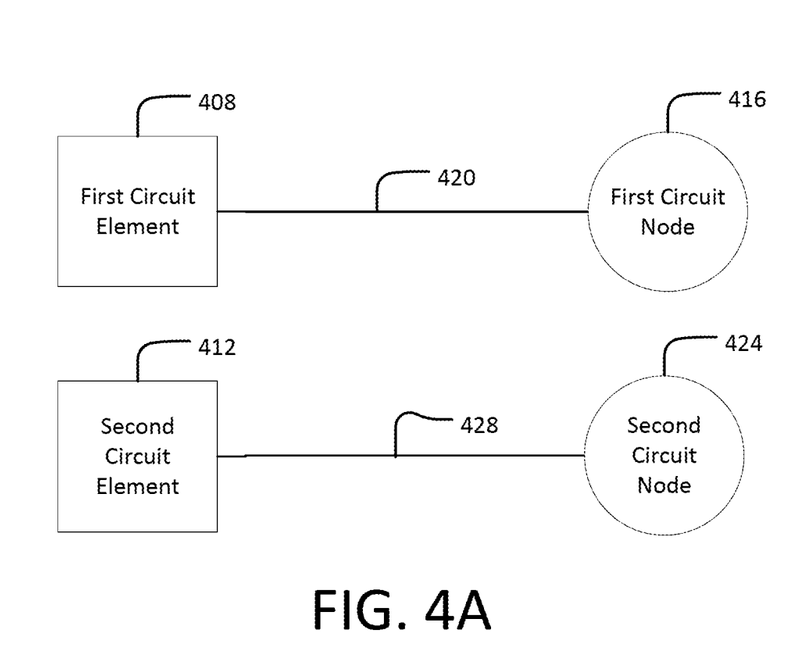
FIGS. 4A-B are schematic illustrations that show an operation of a multiplexer embodiment with reference to example circuit nodes and elements for the analog core shown in FIG. 1.
Figure 4B:
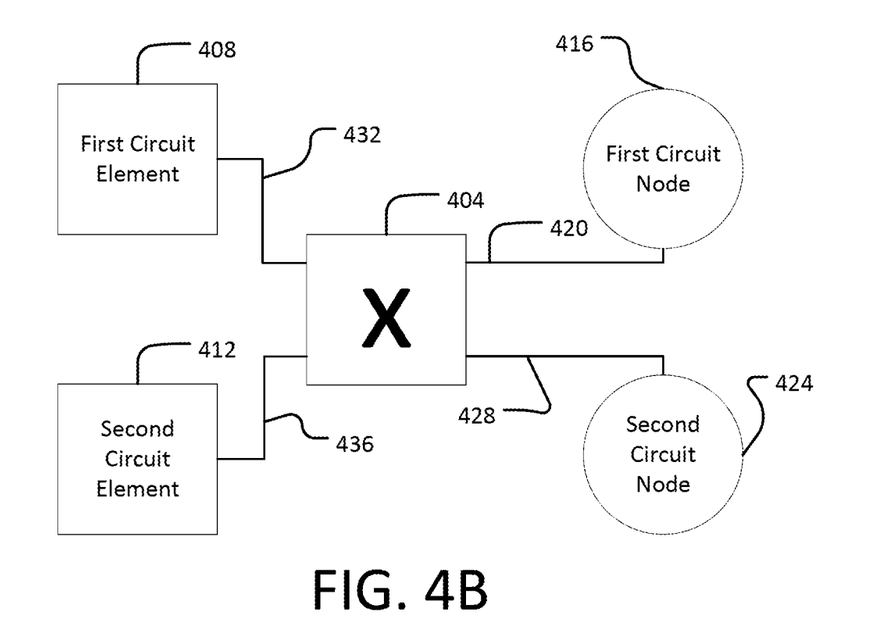

FIGS. 4A-B are schematic illustrations that show a multiplexer operation that causes the analog core 300 to switch between different states. In switching between states, the analog core 300 may select from among various alternative couplings between potentially mismatched circuit elements via the operation of one or more multiplexers 404. FIGS. 4A-B illustrates two example circuit elements 408, 412 that may be potentially mismatched. FIG. 4A shows a circuit configuration without a multiplexer 404. In this configuration, the first circuit element 408 is coupled to a first circuit node 416 through a first circuit coupling 420. Similarly, the second circuit element 412 is coupled to a second circuit node 424 through a second circuit coupling 428. FIG. 4B shows a circuit configuration with a multiplexer 404 arranged between the first circuit element 408 and second circuit element 412. As shown in FIG. 4B, the first circuit coupling 420 extends between the first circuit node 416 and the multiplexer 404. Similarly, the second circuit coupling 428 extends between the second circuit node 424 and the multiplexer 404. The opposite end of the multiplexer 404 couples to first circuit element 408 through a first multiplexer coupling 432. The opposite end of the multiplexer 428 also couples to the second circuit element 412 through a second multiplexer coupling 436.

The multiplexer 404 provides for couplings between the first circuit element 408 and either the first circuit node 416 or second circuit node 424 depending on a state of the multiplexer 404. Similarly, the multiplexer 404 provides for couplings between the second circuit element 412 and either the first circuit node 416 or the second circuit node 424 depending on a state of the multiplexer 404. In a first state, the multiplexer 404 couples the first coupling 420 to the first multiplexer coupling 432 and couples the second coupling 428 to the second multiplexer coupling 436. Here, the first circuit node 416 is coupled to the first circuit element 408 and the second circuit node 424 is coupled to the second circuit element 412. In a second state, the multiplexer 404 couples the first coupling 420 to the second multiplexer coupling 436 and couples the second coupling 428 to the first multiplexer coupling 432. Here, the first circuit node 416 is coupled to the second circuit element 412 and the second circuit node 424 is coupled to the first circuit element 408.

The circuit elements 408, 412 may be potentially mismatched circuit elements in the analog core 300. Potentially mismatched circuit elements include certain pairs or groups of circuit elements that are designed to be matched as part of the design of the analog core 300. When such a pair or group of circuit elements remains matched, the contribution of that pair or group of circuit elements to the function of the analog core remains optimal. When such a pair or group of circuit elements becomes mismatched, the contribution of that pair or group of circuit elements to the function of the analog core degrades and errors may occur in the temperature readings. The multiplexer 404 serves to mitigate effects of the mismatch by switching circuit elements 408, 412 between complementary configurations such that any mismatch between the circuit elements 408, 412 produces complementary errors in the different configurations. For example, the elements 408, 412 may be designed to produce an output at a target level, but when mismatched produce an actual output that is above that target level by a certain amount. With a multiplexer 404 in place, the elements 408, 412 may be switched into a complementary configuration where the mismatch produces an actual output that is below the target level by the same amount. Thus, values obtained in the two configurations may be averaged to produce the target value that would have been obtained had the elements 408, 412 been matched.

Figure 5:
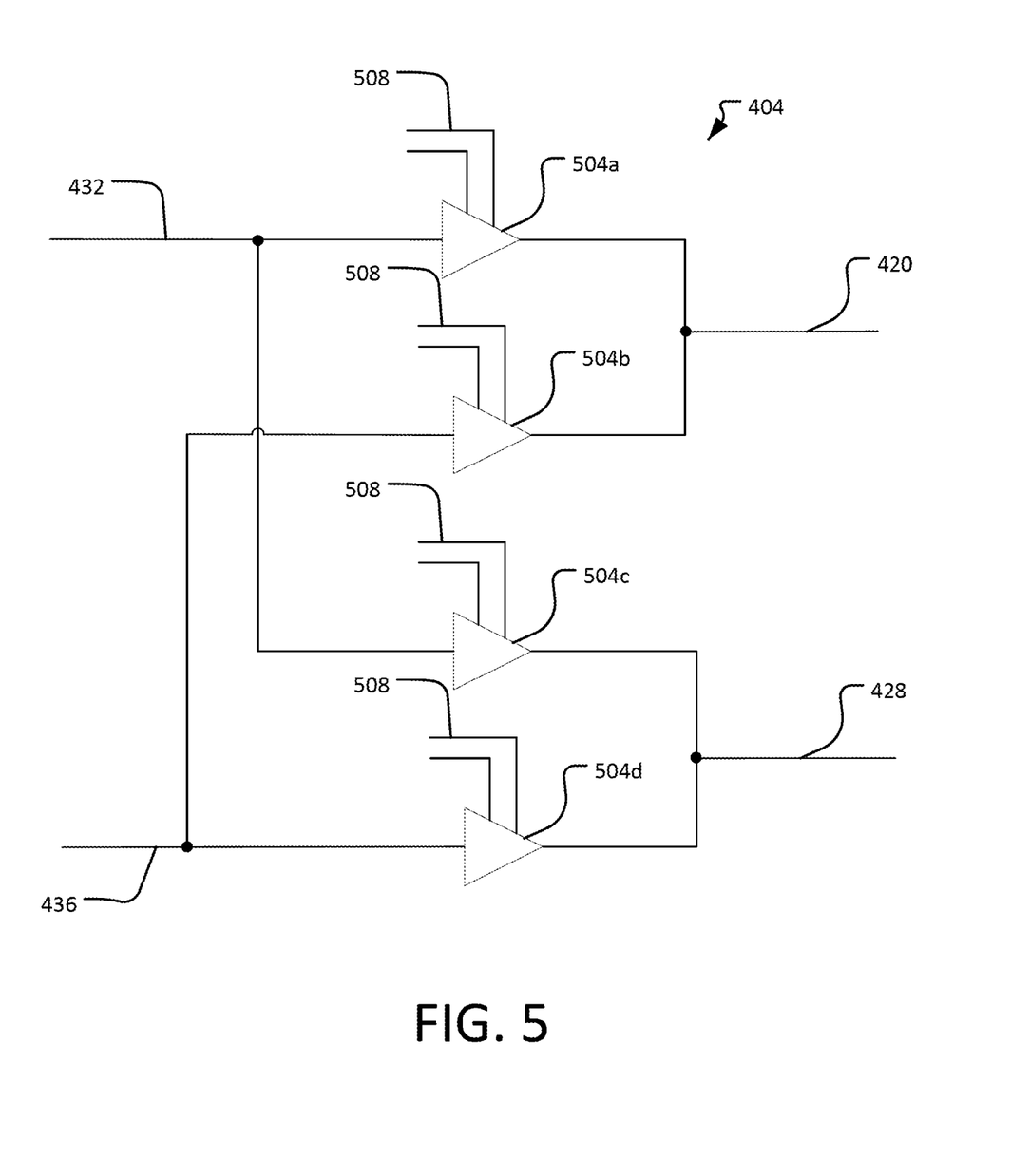
FIG. 5 is an example circuit diagram for a multiplexer in accordance with the present disclosure.

FIG. 5 is an example circuit diagram for the multiplexer 404 shown in FIG. 4B. As shown in FIG. 5, the multiplexer 404 may include a plurality of buffers 504a-d. The first coupling 420 couples to both first buffer 504a and second buffer 504b. The second coupling 428 couples to both first buffer 504c and second buffer 504d. The first multiplexer coupling 432 couples to the first buffer 504a and the first buffer 504c. The second multiplexer coupling 436 couples to the second buffer 504b and the second buffer 504d. The multiplexer 404 also includes control inputs 508 that couple to each of the buffers 504a-d and that are configured to enable and disable the buffers 504a-d as needed to achieve the couplings called for in each of the first and second states of the multiplexer 404.

Figure 6:
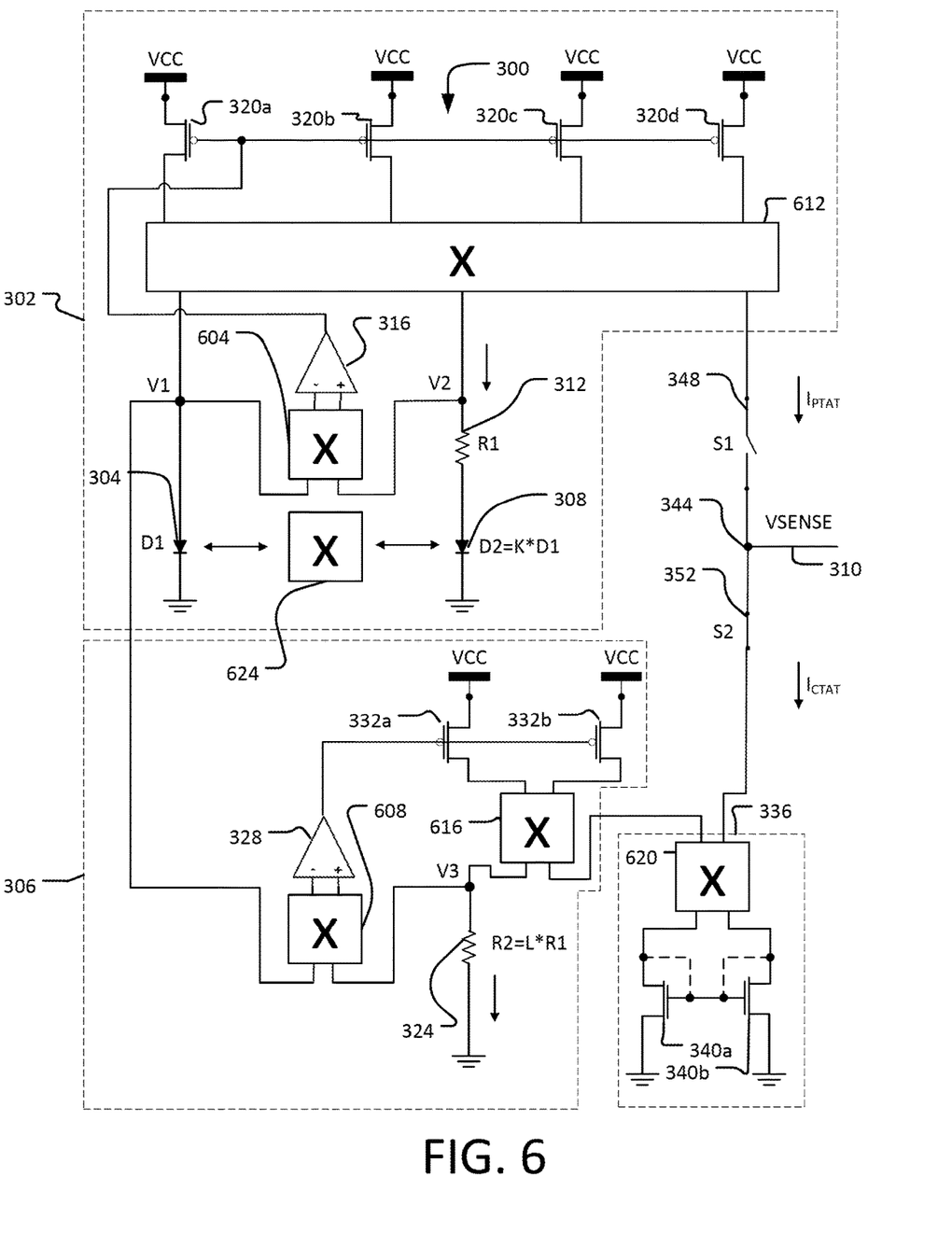
FIG. 6 is a schematic illustration of the example analog core of FIG. 4 including a plurality of multiplexers in accordance with the present disclosure.
Figure 7A:
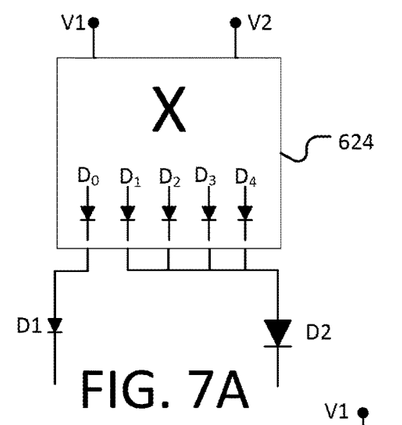
FIGS. 7A-E are schematic illustrations that show example operations of the diode multiplexer shown in FIG. 6.
Figure 7B:
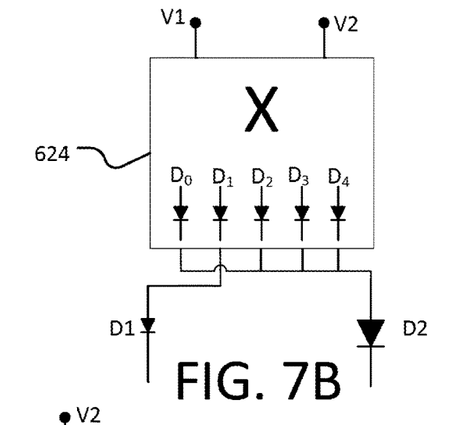
Figure 7C:
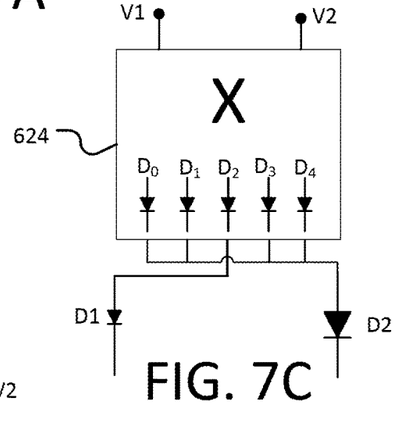
Figure 7D:
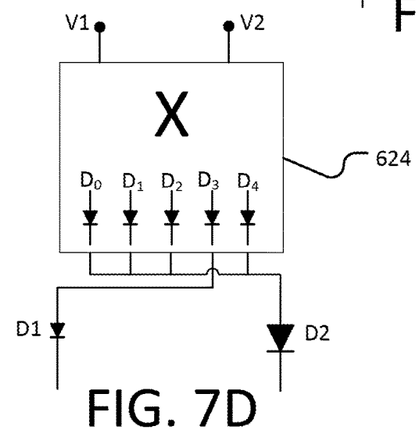
Figure 7E:
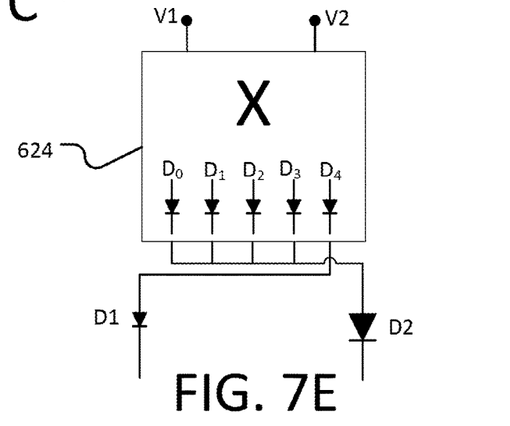

FIG. 6 is a schematic illustration of the example analog core 300 of FIG. 4 including a plurality of multiplexers in accordance with the present disclosure. The various multiplexers shown in FIG. 6 are arranged between components of the analog core 300 that may be identified as potentially mismatched circuit elements. An analog core 300 in accordance with the present disclosure may include one or more of the multiplexers shown in FIG. 6. An analog core 300 may include any combination of multiplexers in a particular implementation. No one multiplexer or combination of multiplexers is required for any given implementation. Generally, any one of the multiplexers shown in FIG. 6 may be included in a particular implementation based on various considerations including which circuit elements in the analog core 300 are likely to become mismatched and, in so doing, degrade the performance of the analog core 300 and the temperature sensor 100. Various potentially mismatched circuit elements and corresponding multiplexers that may be arranged between the potentially mismatched circuit elements are described in greater detail below.

The amplifier 316 that is configured as a feedback element within the first current block 302 may be identified as a potentially mismatched circuit element. Here, the inverting side of the amplifier 316 may be designed to match the non-inverting side. These two sides may become mismatched due to various causes such as wafer thinning, process errors, post packing shifts in device alignment, or the like. In order to mitigate errors caused by this potential mismatch, an analog block 300 may include a multiplexer 604 arranged between the inverting and non-inverting sides of the amplifier 316. As shown in FIG. 6, the $V_1$ node may couple to both the inverting and non-inverting sides of the amplifier 316 through the multiplexer 604. The $V_2$ node may couple to both the inverting and non-inverting sides of the amplifier 316 through the multiplexer 604. Thus, the $V_1$ node couples to the inverting input of the amplifier 316 in a first state of the multiplexer 604 and to the non-inverting side in a second state of the multiplexer 604. Similarly, the $V_2$ node couples to the non-inverting input of the amplifier 316 in a first state of the multiplexer 604 and to the inverting side in a second state of the multiplexer 604.

The amplifier 328 that is configured as a feedback element within the second current block 306 may be identified as a potentially mismatched circuit element. Here, the inverting side of the amplifier 328 may be designed to match the non-inverting side. These two sides may become mismatched due to various causes such as wafer thinning, process errors, post packing shifts in device alignment, or the like. In order to mitigate errors caused by this potential mismatch, an analog block 300 may include a multiplexer 608 arranged between the inverting and non-inverting sides of the amplifier 328. As shown in FIG. 6, the $V_1$ node may couple to both the inverting and non-inverting sides of the amplifier 328 through the multiplexer 608. The $V_3$ node may couple to both the inverting and non-inverting sides of the amplifier 328 through the multiplexer 608. Thus, the $V_1$ node couples to the inverting input of the amplifier 328 in a first state of the multiplexer 608 and to the non-inverting side in a second state of the multiplexer 608. Similarly, the $V_3$ node couples to the non-inverting input of the amplifier 328 in a first state of the multiplexer 608 and to the inverting side in a second state of the multiplexer 608.

The current sourcing transistors 320a-c of the first current block 302 may be identified as potentially mismatching circuit elements. Here, each one of the current sourcing transistors 320a-c may be designed to match the others one of the current sourcing transistors 320a-c. These components may become mismatched due to various causes such as wafer thinning, process errors, post packing shifts in device alignment, or the like. In order to mitigate errors caused by these potential mismatches, an analog block 300 may include a multiplexer 612 arranged between current sourcing transistors 320a-c and other portions of the analog block 300 including the remainder of the first current block 302 and the $V_{SENSE}$ node. Here, the analog block 300 may include a fourth current sourcing transistor 320d so that the multiplexer 612 may be configured to have an even number of states. As shown in FIG. 6, the $V_1$, $V_2$, and $V_{SENSE}$ nodes may each couple to all four of the current sourcing transistors 320a-d through the multiplexer 612. Thus, by way of example, the first current sourcing transistor 320a couples to a different one of the $V_1$, $V_2$, and $V_{SENSE}$ nodes in each of three different states of the multiplexer 612. In a fourth state of the multiplexer 612, the first current sourcing transistor 320a couples to a current sink (not shown in FIG. 6) such that the first current sourcing transistor 320a is de-coupled from the $V_1$, $V_2$, and $V_{SENSE}$ nodes. The multiplexer 612 includes a similar coupling scheme for each of the other current sourcing transistors 320b-d. In this way, the multiplexer 612 may be configured to cycle through eight states, during which cycling each of the $V_1$, $V_2$, and $V_{SENSE}$ nodes couples twice to each of the current sourcing transistors 320a-d.

The current sourcing transistors 332a-b of the second current block 306 may be identified as potentially mismatched circuit elements. Here, the first current sourcing transistor 332a may be designed to match the second current sourcing transistor 332b. These two components may become mismatched due to various causes such as wafer thinning, process errors, post packing shifts in device alignment, or the like. In order to mitigate errors caused by this potential mismatch, an analog block 300 may include a multiplexer 616 arranged between the current sourcing transistors 332a-b. As shown in FIG. 6, the $V_3$ node may couple to both of the current sourcing transistors 332a-b through the multiplexer 616. The source input of the first current sinking transistor 340a may couple to both of the current sourcing transistors 332a-b through the multiplexer 616. Thus, the $V_3$ node couples to the first current sourcing transistor 332a in a first state of the multiplexer 616 and to the second current sourcing transistor 332a in a second state of the multiplexer 616. Similarly, the source input of the first current sinking transistor 340a couples to the second current sourcing transistor 332b in the first state of the multiplexer 616 and to the first current sourcing transistor 332a in the second state of the multiplexer 616.

The current sinking transistors 340a-b of the current sinking component 336 may be identified as potentially mismatched circuit elements. Here, the first current sinking transistor 340a may be designed to match the second current sinking transistor 340b. These two components may become mismatched due to various causes such as wafer thinning, process errors, post packing shifts in device alignment, or the like. In order to mitigate errors caused by this potential mismatch, an analog block 300 may include a multiplexer 620 arranged between the current sinking transistors 340a-b. As shown in FIG. 6, the drain input of the second current sourcing transistor 332b may couple to both of the current sinking transistors 340a-b through the multiplexer 620. The $V_{SENSE}$ node may couple to both of the current sinking transistors 340a-b through the multiplexer 620. Thus, the drain input of the second current sourcing transistor 332b couples to the first current sinking transistor 340a in a first state of the multiplexer 620 and to the second current sinking transistor 340b in a second state of the multiplexer 620. Similarly, the $V_{SENSE}$ node couples to the second current sinking transistor 340b in the first state of the multiplexer 620 and to the first current sinking transistor 340a in the second state of the multiplexer 620.

The diodes $D_1$ and $D_2$ of the first current block 302 may be identified as potentially mismatched circuit elements. As illustrated in FIG. 7A-E, the diodes $D_1$ and $D_2$ may be implemented as a group of N similarly size diodes 704. In operation, one of the diodes 704 may be configured as the "$D_1$ diode" and the remaining N-1 diodes may be configured as the "$D_2$ diode." Here, each one of the diodes 704 may be designed to match each of the other members of the group of diodes 704. These components may become mismatched due to various causes such as process variation during fabrication, or the like. In order to mitigate errors caused by these potential mismatches, an analog block 300 may include a multiplexer 624 arranged to multiplex the group of N similarly size diodes 704 to be configured as the $D_1$ and $D_2$ diodes. This multiplexing arrangement is shown in FIG. 6 and more particularly illustrated in FIG. 7A-E. FIG. 7A-E each illustrates one of five multiplexer states in an example system that includes five similarly sized diodes 704. In each multiplexer state, one of the five diodes is configured as the "$D_1$ diode" through the multiplexer 624 and the remaining four diodes are configured as the "$D_2$ diode" through the 624. FIG. 7A-E show an example arranged that includes five similarly size diodes 704 by way of example and not limitation. The arrangement of FIG. 7A-E may be modified to accommodate a system having an arbitrary number of N similarly size diodes 704. As shown in FIG. 7A-E, the N-1 diodes 704 that are configured as the "$D_2$ diode" also couple to the R1 resistor, which provides the first temperature dependent current ($I_{PTAT}$), which is directly proportional to temperature.

A temperature sensor 100 in accordance with the present disclosure may include further device mismatch mitigation features that may be implemented in addition to or as an alternative to the features described above. In one embodiment, a temperature sensor 100 may include one or more analog devices that are increased in size to reduce intrinsic random device mismatches. Analog devices that may be increased in size to reduce device mismatch include the various components of the analog core 300 discussed above that may be identified as potentially mismatched circuit elements. The size of the analog device may be measured by the parameter W*L. Stated another way, the analog device size may be measured by the area occupied by the transistor channel. It has been found that the amount of device mismatch has an inverse relationship to the size of the device. The larger the size, the lesser the mismatch. The amount of mismatch reduction is typically proportional to the square root of the increase in device size. For example, if the device size is increased by four, the mismatch is reduced to one half of its prior amount. If the device size is increased by nine, the match is reduces to one third of its prior amount, and so on. In one particular implementation that balances the reduction in device mismatch with increased usage of chip area, analog devices that are potentially mismatched are increased in size by between two and four times.

A temperature sensor 100 may also mitigate device mismatch by regulating a power supply voltage that provides power to the analog core 300. Specifically, one or more of the $V_{cc}$ nodes shown in FIG. 3 and FIG. 6 may be connected to a voltage regulator. Through the operation of the voltage regulator, the various $V_{cc}$ nodes may be configured to output a voltage that generally remains constant across an operating range of current and power demanded by the analog core 300. The various $V_{cc}$ nodes may be connected to dedicated voltage regulators or may be connected to a voltage regulator that also regulates other on-chip devices. By regulating the power supply voltage that provides power to the analog core 300, the external voltage variation is reduced which, in turn, reduces the voltage dependence of the analog core 300. Reducing the voltage dependence of the analog core 300 reduces the extent to which errors due to device mismatches are amplified at the analog core 300 output.

A temperature sensor 100 may also mitigate device mismatch by adjusting the slope of the temperature dependent currents provided by the analog core 300. As mentioned, the analog-to-digital converter 120 may be configured to increment or decrement the digital code by 1 for every 1° C. change in temperature. This configuration of the analog-to-digital converter 120 is achieved, at least in part, by configuring the analog core 300 to change its output as a function of temperature in a certain predetermined way. Typically, this change in analog core 300 output is measured by the slope of the $I_{PTAT}$ or $I_{CTAT}$ versus temperature curve, such as shown in FIG. 2. Generally, the analog core 300 is configured such that the slope of the $I_{PTAT}$ or $I_{CTAT}$ versus temperature curve produces the linear digital code changes described above. Device mismatches can potentially cause the $I_{PTAT}$ or $I_{CTAT}$ versus temperature curve to vary from its optimal slope. Thus, in order to compensate for device mismatch errors, the analog core 300 may be configured to operate across a range of $I_{PTAT}$ or $I_{CTAT}$ versus temperature slopes and to adjust in order to maintain the desired digital code incrementing and decrementing described above.

Figure 8:
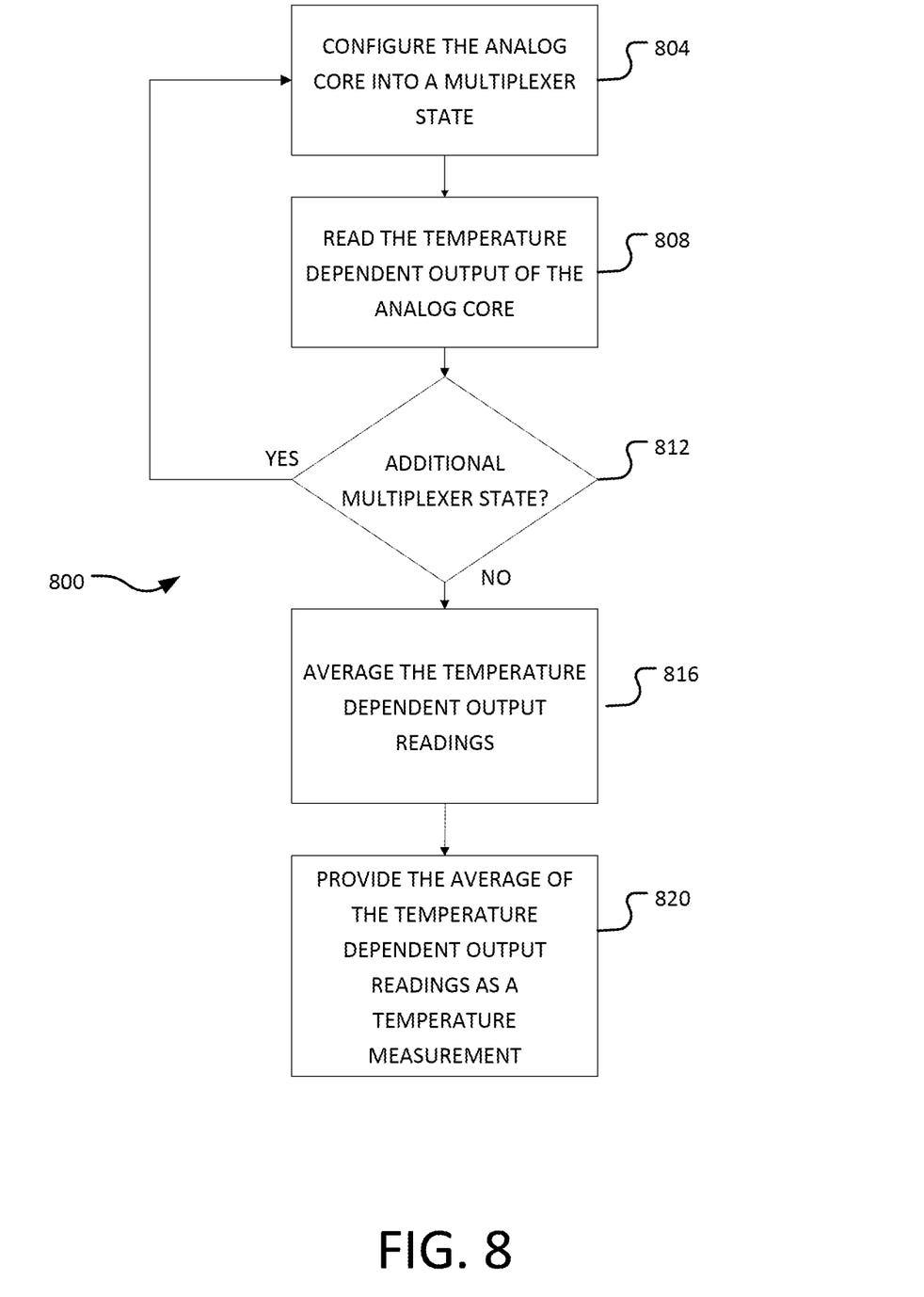
FIG. 8 is flow chart that illustrates example operations of the temperature sensor of FIG. 1.

FIG. 8 is flow chart 800 that illustrates example operations of the temperature sensor 100 of FIG. 1 according to an embodiment of the invention. Initially, in operation 804, the temperature sensor 100 configures an analog core 300 into a particular state. Operation 804 may include configuring the analog core 300 using one or more multiplexers that select alternative couplings between at least one pair of circuit elements that when mismatched generate an error in the temperature dependent output.

In operation 808, the temperature sensor 100 reads a temperature dependent output from the analog core 300 with the analog core 300 configured in a particular state according to settings applied to the one or more multiplexers in operation 804. Operation 808 may include storing the temperature reading obtained from the analog core 300 such that the temperature reading may later be averaged with prior and/or subsequent temperature readings.

In operation 812, the temperature sensor 100 determines if additional temperature readings are to be taken. Here, the temperature sensor 100 may be configured to cycle the analog core 300 through various states and to obtain a temperature reading from each. If the cycle is not complete and additional temperature readings are to be taken, operations 804 and 808 are again executed following operation 812. Here, the analog core 300 is configured into the next state and a temperature reading is taken and stored. If the cycle is complete and no additional temperature readings are to be taken, operation 816 is executed following operation 812.

In operation 816, the temperature sensor 100 averages the various temperate readings that were stored operation 808. The various temperature readings taken in operation 808 may include complementary errors that are generated when mismatched analog core 300 elements are read in different, complementary configurations. These complementary errors may cancel each other when the temperature readings are averaged in operation 816.

In operation 820, the temperature sensor 100 provides the average of the temperature dependent output readings as a temperature measurement. Operation 820 may include providing the temperature measurement to an integrated circuit, memory device, or electronic device with which the temperature sensor 100 is associated. When the temperature measurement is provided to memory component, the memory component may use the temperature measurement to determine a refresh rate.

As described in connection with operation 812, the temperature sensor 100 may be configured to cycle the analog core 300 through various states and to obtain a temperature reading from each. In some embodiments, the number of cycles though which the temperature sensor 100 cycles the analog core 300 may correspond to the number of possible states for the one or more multiplexers. For example, referring to the example configuration of FIG. 7A-7E, the temperature sensor 100 may cycle through five temperature readings, one for each possible state of the multiplexer 624. More generally, the temperature sensor 100 may cycle through N temperature readings when the multiplexer 624 is arranged between a $D_1$ diode of size 1 and a $D_2$ diode of size N-1. In other embodiments, the number of cycles though which the temperature sensor 100 cycles may optimize the utilization of a particular circuit component. For example, referring to FIG. 6, the temperature sensor 100 may cycle through eight temperature readings so as to allow each of the $V_1$, $V_2$, and $V_{SENSE}$ nodes to couple twice to each of the current sourcing transistors 320a-d. These example configurations for the temperature sensor 100 cycling are provided by way of example and not limitation. Generally, the temperature sensor 100 may be configured to cycle the analog core 300 through any number of states in connection with obtaining a group of temperature measurement to be averaged.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Figure 9:
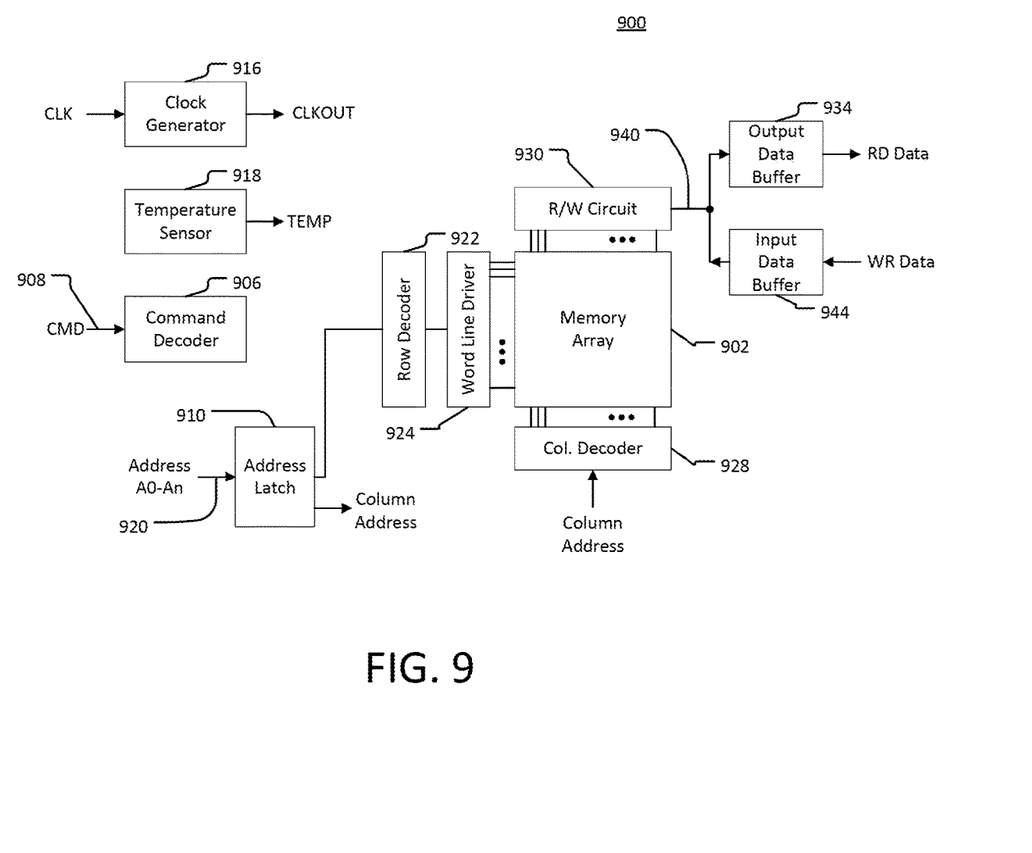
FIG. 9 is a block diagram of a memory, according to an embodiment of the invention.

FIG. 9 is a block diagram of a memory, according to an embodiment of the invention. The memory 900 may include an array 902 of memory cells, which may be, for example, volatile memory cells (e.g., dynamic random-access memory (DRAM) memory cells, static random-access memory (SRAM) memory cells), non-volatile memory cells (e.g., flash memory cells), or some other types of memory cells. The memory 900 includes a command decoder 906 that may receive memory commands through a command bus 908 and provide (e.g., generate) corresponding control signals within the memory 900 to carry out various memory operations. For example, the command decoder 906 may respond to memory commands provided to the command bus 908 to perform various operations on the memory array 902. In particular, the command decoder 906 may be used to provide internal control signals to read data from and write data to the memory array 902. Row and column address signals may be provided (e.g., applied) to an address latch 910 in the memory 900 through an address bus 920. The address latch 910 may then provide (e.g., output) a separate column address and a separate row address.

The address latch 910 may provide row and column addresses to a row address decoder 922 and a column address decoder 928, respectively. The column address decoder 928 may select bit lines extending through the array 902 corresponding to respective column addresses. The row address decoder 922 may be coupled to a word line driver 924 that activates respective rows of memory cells in the array 902 corresponding to received row addresses. The selected data line (e.g., a bit line or bit lines) corresponding to a received column address may be coupled to a read/write circuitry 930 to provide read data to an output data buffer 934 via an input-output data path 940. Write data may be provided to the memory array 902 through an input data buffer 944 and the memory array read/write circuitry 930. A clock generator 916 may provide an internal clock signal CLKOUT responsive to an input clock signal CLK. The CLKOUT signal may be used by circuits of the memory, for example, the output data buffer 934 and the input data buffer 944.

The memory 900 may include a temperature sensor 918, according to an embodiment of the invention. The temperature sensor 918 may be implemented by an embodiment of the temperature sensor as previously described, for example. The temperature sensor 918 may measure a temperature and provide an output temperature measurement TEMP output, for example, to other circuits of the memory 900. In some embodiments, the memory 900 may adjust some of their operations based on temperature readings provided by the temperature sensor 918.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

The foregoing description has broad application. The discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and the appended claims are intended to be construed to include such variations, except as limited by the prior art.

The invention claimed is:

1. A method of sensing temperature, comprising:
   configuring an analog core into a first multiplexer state such that a non-inverting input of an amplifier of the analog core is coupled to a first circuit element and an inverting input of the amplifier is coupled to a second element;
   reading a first temperature dependent voltage from a temperature dependent output from the analog core in the first multiplexer state,
   configuring the analog core into a second multiplexer state such that the non-inverting input of the amplifier is coupled to the second element and the inverting input of the amplifier is coupled to the first element;
   reading a second temperature dependent voltage from the temperature dependent output from the analog core in the second multiplexer state;
   averaging the first and second temperature dependent voltage readings; and
   providing the average of the first and second temperature voltage readings as a temperature measurement.

2. The method of claim 1, further comprising selecting alternative couplings between the first and second circuit elements that when mismatched generate an error in the temperature dependent output.

3. The method of claim 2, further comprising reading the output for the first and second multiplexer states that include complementary configurations for the first and second circuit elements.

4. The method of claim 3, further comprising cancelling complementary errors produced by the first and second circuit elements in the complementary configurations while averaging.

5. The method of claim 2, further comprising activating a switch to select a coupling between the first circuit element and the non-inverting input.

6. The method of claim 5, further comprising activating a second switch to select a coupling between the second circuit element and the first-non-inverting input.

7. The method of claim 1, further comprising providing the temperature measurement to a computer memory component that uses the temperature measurement to determine a refresh rate.

8. The method of claim 1, wherein the first and second temperature dependent voltage readings are generated based on a current of the analog core that increases as a temperature increases.

9. The method of claim 8, wherein the first and second temperature dependent voltage readings are generated based on a current of the analog core that decreases as the temperature increases.

10. The method of claim 9, wherein the current is provided by one of a first current block of the analog core or a second current block of the analog core.

11. The method of claim 1, further comprising converting the first and second temperature dependent voltage readings from the analog core from analog values to a digital values prior to averaging the first and second temperature dependent voltage readings.

12. A memory device, comprising:
    an analog core that comprises an amplifier configured to provide an output on which a temperature reading of a group of temperature readings is based, wherein first and second inputs of the amplifier are coupled to first and second input signals, respectively, for a first temperature reading of the group of temperature readings and the first and second inputs of the amplifier are coupled to second and first input signals, respectively, for a second temperature reading of the group of temperature readings;
    a temperature sensor configured to provide the group of temperature readings of the analog core, each temperature reading of the group of temperature readings corresponding to a different configuration of the analog core;
    an averaging block associated with the temperature sensor and configured to average the temperature readings and to provide a temperature measurement that is provided as output by the temperature sensor; and
    a memory array coupled to the temperature sensor and configured to receive the temperature reading as input and to set a refresh rate for the memory array based on the temperature reading.

13. The memory device of claim 12, further comprising a plurality of multiplexers associated with the analog core and configured to provide the different configurations by switching among alternative couplings between matching circuit components.

14. The memory device of claim 13, further comprising an analog-to-digital converter configured to provide the temperature readings as digital codes read from the analog core.

15. The memory device of claim 14, further comprising a calibration block configured to re-center the digital code at a zero point based on a baseline temperature around which the analog core is known to operate.

16. The memory device of claim 12, wherein the analog core is configured to provide a first temperature dependent output reading generated based on a first current that increases as a temperature increases.

17. The memory device of claim 16, wherein the analog core is further configured to provide a second temperature dependent output reading that is generated based on a second current that decreases as the temperature increases.

18. The memory device of claim 17, wherein the analog core comprises a first current block configured to provide the first current and a second current block configured to provide the second current.

* * * * *

UNITED STATES PATENT AND TRADEMARK OFFICE
CERTIFICATE OF CORRECTION

PATENT NO. : 11,781,918 B2  
APPLICATION NO. : 16/509262  
DATED : October 10, 2023  
INVENTOR(S) : Dong Pan Page 1 of 1

It is certified that error appears in the above-identified patent and that said Letters Patent is hereby corrected as shown below:

In the Claims

| Column | Line | Claim | Reads | Should Read |
|--------|------|-------|-------|-------------|
| 14 | 10 | 6 | the first-non-inverting input. | the non-inverting input. |

Signed and Sealed this  
Ninth Day of January, 2024

Katherine Kelly Vidal  
*Director of the United States Patent and Trademark Office*